(12) United States Patent
Hou

(10) Patent No.: US 10,982,534 B2
(45) Date of Patent: Apr. 20, 2021

(54) SYSTEMS AND METHODS TO DETERMINE FORMATION PROPERTIES OF HIGH-RESISTIVITY FORMATIONS

(71) Applicant: Halliburton Energy Services, Inc., Houston, TX (US)

(72) Inventor: Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/337,354

(22) PCT Filed: Dec. 7, 2016

(86) PCT No.: PCT/US2016/065405
§ 371 (c)(1),
(2) Date: Mar. 27, 2019

(87) PCT Pub. No.: WO2018/106228
PCT Pub. Date: Jun. 14, 2018

(65) Prior Publication Data
US 2020/0032642 A1 Jan. 30, 2020

(51) Int. Cl.
*G01V 3/00* (2006.01)
*E21B 47/13* (2012.01)
(Continued)

(52) U.S. Cl.
CPC .............. *E21B 47/13* (2020.05); *G01V 3/28* (2013.01); *G01V 3/32* (2013.01); *G01V 3/38* (2013.01)

(58) Field of Classification Search
CPC .......... E21B 47/122; G01V 3/28; G01V 3/32; G01V 3/38
(Continued)

(56) References Cited

U.S. PATENT DOCUMENTS 5,814,988 A 9/1998 Itskovich et al.
6,032,101 A 2/2000 Freedman et al.
(Continued)

OTHER PUBLICATIONS

International Search Report & Written Opinion armed for corresponding International Application No. PCT/US2018/065406 dated Aug. 28, 2017. (16 pages).
(Continued)

*Primary Examiner* — Zhen Y Wu
(74) *Attorney, Agent, or Firm* — McGuireWoods LLP

(57) ABSTRACT

The disclosed embodiments include a method to determine formation properties of a downhole formation and a downhole logging system. In one embodiment, the method includes obtaining a first set of measurements of a formation from a multi-component induction logging tool and performing an inversion process of the first set of measurements to determine a first set of values for one or more formation properties of the formation. The method also includes determining a second set of values for the model parameters based on the measurements of a second logging tool. The method further includes comparing values of the first set of values with corresponding values of the second set of values to determine a data quality of the values of the first set of values and accepting the values of the first set of values if the data quality of the values is above a first threshold.

20 Claims, 3 Drawing Sheets

(51) Int. Cl.
*G01V 3/28* (2006.01)
*G01V 3/32* (2006.01)
*G01V 3/38* (2006.01)

(58) Field of Classification Search
USPC .................................................. 340/854.6
See application file for complete search history.

(56) References Cited

U.S. PATENT DOCUMENTS

| | | | |
|---|---|---|---|
| 6,255,819 B1 | 7/2001 | Day et al. | |
| 6,400,148 B1* | 6/2002 | Meyer | G01R 33/50 324/300 |
| 9,645,275 B2* | 5/2017 | Kumar | E21B 47/026 |
| 2003/0222651 A1* | 12/2003 | Tabanou | G01V 11/002 324/367 |
| 2004/0140801 A1* | 7/2004 | Schoen | G01V 3/32 324/303 |
| 2006/0085135 A1* | 4/2006 | Clavaud | G01V 3/20 702/12 |
| 2007/0208546 A1* | 9/2007 | Fang | G01V 3/28 702/191 |
| 2007/0257677 A1* | 11/2007 | Wang | G01V 3/20 324/347 |
| 2007/0265784 A1 | 11/2007 | Bal et al. | |
| 2013/0080059 A1* | 3/2013 | Kumar | G01V 3/20 702/7 |
| 2016/0084983 A1* | 3/2016 | Wu | G01V 3/104 702/7 |
| 2016/0139291 A1* | 5/2016 | Saidian | G01N 24/081 324/303 |
| 2016/0223702 A1* | 8/2016 | Hou | G01V 3/38 |
| 2017/0102479 A1* | 4/2017 | Kouchmeshky | E21B 47/13 |

OTHER PUBLICATIONS

Hou et at "Characterization of Formation Fractures with Multicomponent induction Logging Based on Biaxial Anisotropy Models: Method and Case Studies", Society of Petrophysicists and Well-Log Analysts, Aug. 10, 2015, 20 pages.

Hou et al, "A New Multi Frequency Triaxial Array Induction Tool for Enhancing Evaluation of Anisotropic Formations and its Field Testing", Society of Petrophysioists and Well-Log Analysts, Jan. 1, 2013, 7 pages.

Quirein et al. "Evaluation of general resistivity density-based saturation in thin, laminated sand-shale sequences": AAPG International Conference & Exhibition, Sep. 16. 2012, 21 pages.

Mollison et al. "A Model for Hydrocarbon Saturation Detennination From an Orthogonal Tensor Relationship in Thinly Laminated Anisotropic Reservoirs" Society of Petrophysicists and Well-Log Analysts, Jan. 1, 1999,14 pages.

Thomas et al, "The Distribution of Shale in Sandstones and Its Effect Upon Porosity", Society of Petrophysioists and Well-Log Analysts. Jan. 1, 1975; 15 pages.

* cited by examiner

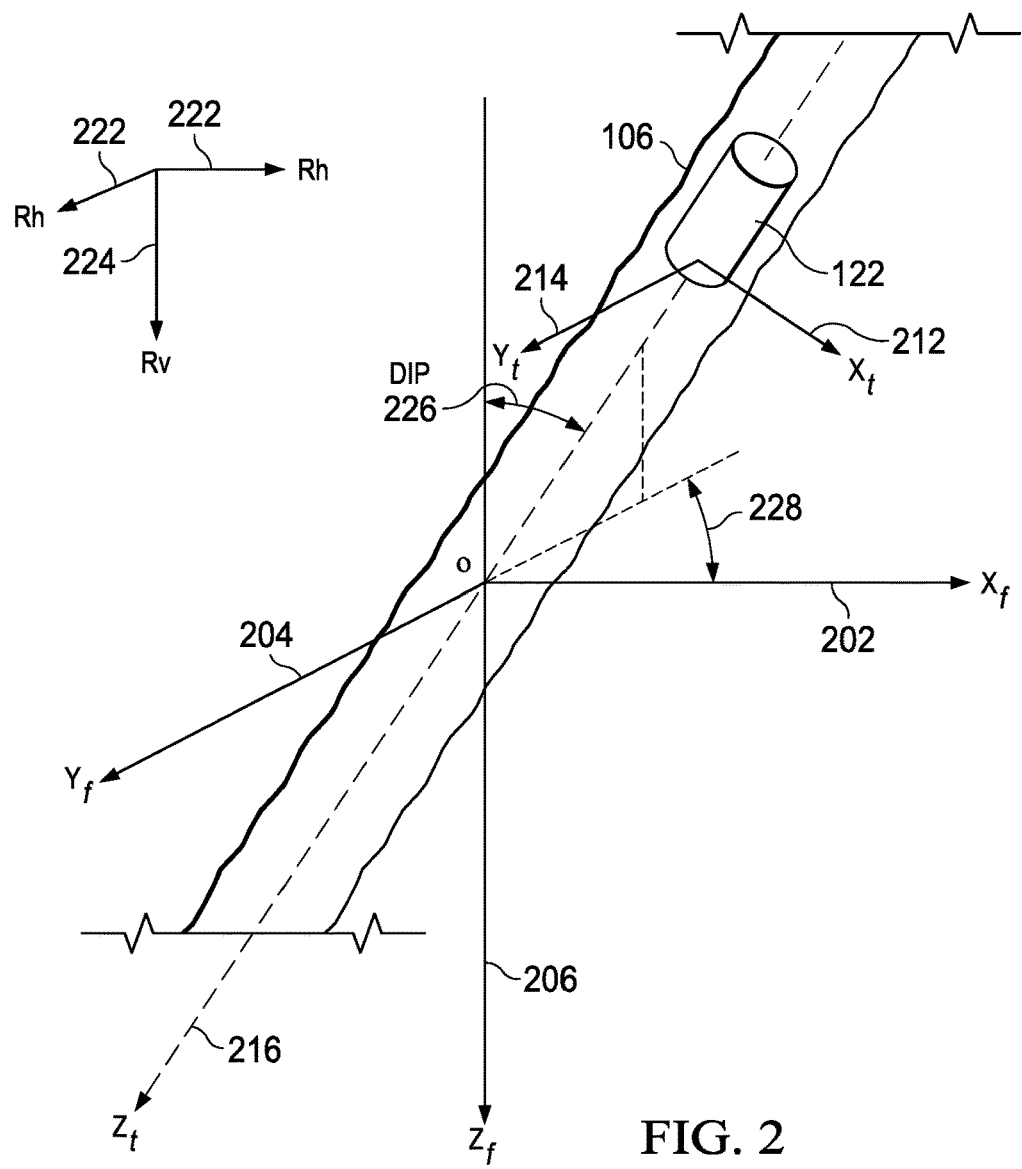
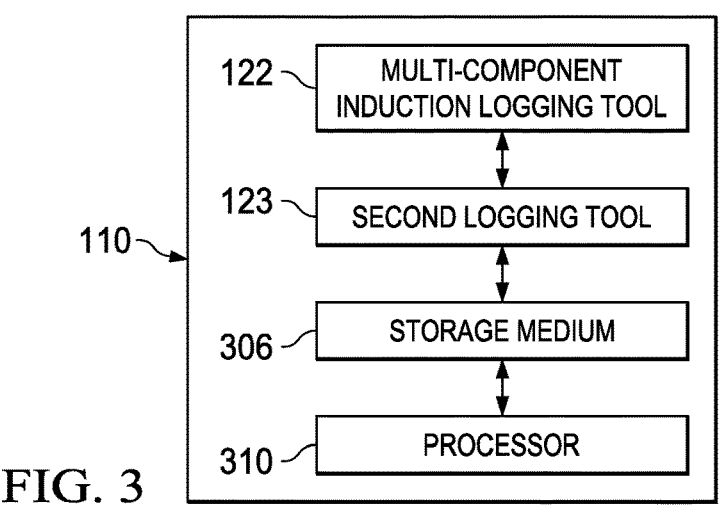
FIG. 2
FIG. 3

SYSTEMS AND METHODS TO DETERMINE FORMATION PROPERTIES OF HIGH-RESISTIVITY FORMATIONS

BACKGROUND

The present disclosure relates generally to downhole logging systems, and methods to determine downhole properties of a subsurface formation.

Oil and gas companies often utilize different logging techniques to determine a resistivity of a formation ("formation resistivity") which may be interpreted to estimate an abundance of hydrocarbon resources in the formation, abundance of other types of fluids in the formation, the material properties and composition of one or more layers of the formation, volume of the formation, as well as other properties of the formation ("formation properties"). Multi-component induction (MCI) logging tools are often utilized to evaluate the formation resistivity of various types of anisotropic formations, which have directionally dependent resistivity properties. More particularly, MCI logging tools may be utilized to obtain measurements indicative of formation resistivity of anisotropic formations both vertically and horizontally, where horizontal resistivity refers to resistivity along a direction parallel to a plane of the formation, and where vertical resistivity refers to resistivity along a direction perpendicular to the plane of the formation. An inversion process is performed on the measurements to obtain the horizontal resistivity and vertical resistivity. The horizontal and vertical resistivities of the formation are utilized as input model parameters of one or more geologic modellings of the formation that are indicative of the formation properties of the formation.

Currently available MCI logging tools sometimes overestimate a vertical resistivity of a formation in high resistivity formation. These errors propagate and result in inaccurate geologic modellings of the formation, which in turn provide inaccurate indications of formation properties of the formation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 2 illustrates a schematic view of an orientation of a MCI logging tool of the downhole logging system of FIG. 1 relative to the formation, where the MCI logging tool and the formation are not aligned;

FIG. 3 illustrates a block diagram of components of the downhole logging system of FIG. 1.

Figure 1:
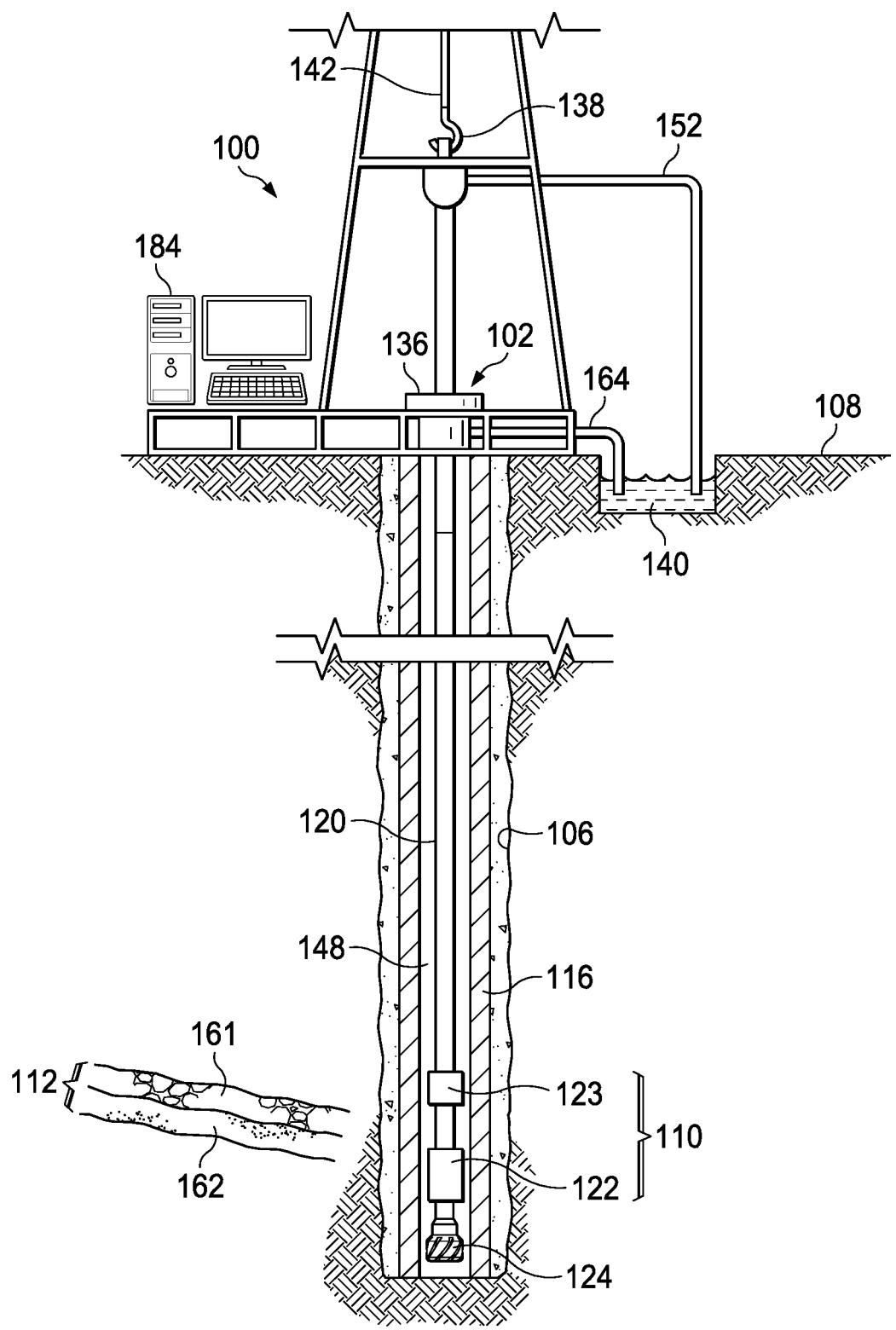
FIG. 1 illustrates a schematic view of a logging while drilling ("LWD") environment in which a logging system is deployed on a tool string in an annulus of a production casing.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to downhole logging systems, and methods to determine downhole properties of a downhole formation. The downhole logging system is deployed in a wellbore of a well and includes a MCI logging tool having a set of transmitter coils operable to drive electromagnetic signals into a formation proximate the MCI logging tool. The MCI logging tool also includes a set of receiver coils operable to measure response signals ("a first set of measurements") from the formation. The downhole logging system also includes a processor operable to perform an inversion process of the first set of measurements to determine one or more input model parameters for one or more geologic modellings of the formation that are indicative of the formation properties of the formation. As defined herein, the model parameters include the horizontal resistivity of the formation, the vertical resistivity of the formation, a relative dip angle between a longitudinal axis of the MCI logging tool and the normal plane of the formation ("dip angle"), a relative azimuth angle between the longitudinal axis of the MCI logging tool and an x-axis of a plane of the formation, as well as other parameters described herein.

The processor then utilizes the model parameters as inputs in one or more geologic modelling of the formation to determine a set of values ("first set of values") for one or more formation properties of the formation. For example, the horizontal resistivity and the vertical resistivity may be inputted in a bimodal rock-physical model to determine values for the resistivity of a shale layer of a laminated formation having a shale layer and a reservoir rock layer ("sand layer"), resistivity of the sand layer of the laminated formation, volume of the laminated formation, volumetric fraction of laminated shale in the laminated formation, water saturation of the formation (individually and collectively referred to as "formation properties"), as well as other formation properties described herein.

The downhole logging system also includes an additional logging tool, such as but not limited to a nuclear magnetic resonance ("NMR") logging tool, a sonic logging tool, and a conventional logging tool. The processor is operable to obtain measurements made by the additional logging tool, and is further operable to determine a set of values ("second set of values") for the one or more formation properties of the formation. Continuing with the previous example, the processor is operable to determine values for the volume of the laminated formation and the volumetric fraction of the laminated shale in the lamination formation based on the measurements of the NMR logging tool. The processor is further operable to compare the first set of values of the formation properties, which are based on the measurements of the MCI logging tool with the second set of values of corresponding formation properties, which are based on measurements of the additional logging tool, to determine data quality of the one or more values of the formation properties determined based on the measurements of the MCI logging tool. In some embodiments, the data quality of the first set of values may be accepted if the data quality is above a threshold quality value. In one example, the data quality of the first set of values is above the threshold quality value if the first set of values for the formation properties and the second set of values for corresponding formation properties do not deviate by more than a threshold discrepancy value.

Continuing with the previous example, if the first set of values indicate that the volumetric fraction of the laminated shale in the laminated formation is 30% and the water saturation of the formation is 10%, the second set of values indicate that the volumetric fraction of the laminated shale in the laminated formation is 29% and the water saturation of the formation is 10.2%, and the threshold discrepancy value is 5%, then the processor would consider the first set of values, which are obtained based on the measurements of the MCI logging tool to be acceptable. Alternatively, if the first set of values indicate that the volumetric fraction of the laminated shale in the laminated formation is 50% and the water saturation of the formation is 10%, the second set of values indicate that the volumetric fraction of the laminated shale in the laminated formation is 29% and the water saturation of the formation is 10.2%, and the threshold discrepancy value is 5%, then the processor would re-calculate one or more values of the model parameters, such as the horizontal resistivity of the formation, the vertical resistivity of the formation, the dip angle, and/or the azimuth angle. In some embodiments, the processor determines, based on one or more resistivity logs of the formation, a lower bound of the vertical resistivity and an upper bound of the vertical resistivity of the formation. In such embodiments, the data quality of the one or more values for the formation properties is above the threshold quality value if the vertical resistivity of the formation is between a lower bound and an upper bound of the vertical resistivity of the formation. In one of such embodiments, the processor also defines a range within the lower and the upper bounds as a constrained minimization of the modeling parameters. The processor would then re-determine the first set of values for the formation properties, which are based on the re-calculated model parameters, and compare the re-determined first set of values with the second set of values for corresponding formation properties to determine if the re-determined first set of values are acceptable.

The foregoing process repeats until the first set of values of the formation properties becomes acceptable. In some embodiments, the processor is operable to generate an error message if the processor is unable to obtain acceptable values after a threshold number of iterations (e.g., 3 tries, 5 tries, 10 tries, or a different number of tries) of the foregoing process. In some embodiments, the downhole logging system includes two or more additional logging tools. In such embodiments, the processor is operable to determine a set of values for the one or more formation properties ("the second set of values, the third set of values, etc.") based on measurements of each of the additional logging tools. The processor is further operable to compare one or more values of the first set of values for the formation properties with corresponding values of the second, third, and additional sets of values, which are obtained based on measurements of the additional logging tools to determine whether the first set of values are acceptable. Additional details of the foregoing downhole logging system and methods to determine formation properties of the downhole formation are provided in the paragraphs below and are illustrated in at least FIGS. 1-4.

Now turning to the figures, FIG. 1 illustrates a schematic view of a LWD environment 100 in which a logging system 110 is deployed on a tool string 120 in an annulus of a production casing 116. FIG. 1 may also represent a MWD environment, a wireline logging environment, or another production or preparation environment where the downhole logging system 110 is deployed. In the embodiment of FIG. 1, the production casing 116 extends from a surface 108 of well 102 down wellbore 106 to insulate the downhole logging system 110, drill 124, as well as other downhole tools deployed in the production casing 116 from the surrounding subterranean formation 112, to prevent cave-ins, and/or to prevent contamination of the surrounding subterranean formation 112. In the embodiment of FIG. 1, the subterranean formation 112 is a laminated earth formation having a shale layer 161 and a sand layer 162. A cement sheath (not shown) is deposited along an annulus between the wellbore 106 and the production casing 106 to set the production casing 116 and to form a barrier that seals the production casing 116.

A hook 138, cable 142, traveling block (not shown), and hoist (not shown) are provided to lower the tool string 120 down the wellbore 106 or to lift the tool string 120 up from the wellbore 106. The tool string 120 may be a wireline tool string, a slickline tool string, a drill string, or another type of tool string operable to deploy the logging system 110. At wellhead 136, an inlet conduit 152 is coupled to a fluid source (not shown) to provide fluids, such as drilling fluids, downhole. The tool string 120 has an internal cavity that provides a fluid flow path from the surface 108, down the tool string 120, and exit the tool string 120 at the drill bit 124. The fluids flow back towards the surface 108 through a wellbore annulus 148 and exit the wellbore annulus 148 via an outlet conduit 164 where the fluids are captured in a container 140.

The downhole system 110 includes a MCI logging tool 122 and a second logging tool 123. As described herein, the second logging tool 123 may be a sonic logging tool, a NMR logging tool, a conventional logging tool, or another type of logging tool that may be deployed downhole to determine one or more formation properties of the formation 112. The downhole system 110 also includes a processor (not shown) that may be a component of the MCI logging tool 122, a component of the second logging tool 123, a standalone component that is deployed downhole, or a component of a surface based electronic device, such as controller 184. In that regard, the controller 184 represents any electronic device operable to obtain measurements obtained by the MCI logging tool 122 and the second logging tool 123, perform operations described herein to determine values of the one or more formation properties determined based on the measurements made by the MCI logging tool 122 and the second logging tool 123, and compare the foregoing values of the one or more formation properties to determine whether values of the formation properties based on measurements of the MCI logging tool 122 are acceptable. In some embodiments, the controller 184, the MCI logging tool 122, and the second logging toll 123, are components of a downhole logging system 110. Additional descriptions of the downhole logging system 110 are provided in the paragraphs below and are illustrated in at least FIGS. 2-4.

FIG. 2 illustrates a schematic view of an orientation of a MCI logging tool 122 of the downhole logging system 110 of FIG. 1 relative to the formation 112 of FIG. 1, where the MCI logging tool 122 and the formation 112 are not aligned. As defined herein, a logging tool is aligned with a formation if a longitudinal axis of the downhole logging tool is substantially parallel to an axis that is normal to the plane of the formation 112. As shown in FIG. 2, $X_f$ axis 202 and $Y_f$ axis 204 represent x-axis and y-axis of the formation 112, which intersect each other to form a plane parallel to the plane of the formation 112. Further, $Z_f$ axis 206 represents z-axis of the formation 112, which is oriented along directions normal to the plane of the formation 112. $X_t$ axis 212 and $Y_t$ axis 214 represent x-axis and y-axis of the MCI logging tool 122, which intersect each other to form a plane normal to a longitudinal axis of the MCI logging tool 112. Further, $Z_t$ axis 216 represents the longitudinal axis of the MCI logging tool 122.

The processor of the downhole logging system 110 is operable to perform an inversion process of measurements obtained by the MCI logging tool 122 to calculate model parameters such as the horizontal resistivity of the formation, the vertical resistivity of the formation, the dip angle, and the azimuth angle. As shown in FIG. 2, dip angle is represented by a relative dip angle 226 between $Z_f$ axis 206 and $Z_t$ axis 216 and azimuth angle is represented by a relative azimuth angle 228 between $Z_t$ axis 216 and an $X_f$ axis 202. Further, the horizontal resistivity of the formation 112 is represented by arrows 222, whereas the vertical resistivity of the formation is represented by arrow 224.

FIG. 3 illustrates a block diagram of components of the downhole logging system 110 of FIG. 1. The downhole logging system 110 includes the MCI logging tool 122 component having a plurality of transmitter and receiver coils that are operable to transmit electromagnetic signals into the formation 112, and to obtain a first set of measurement of the formation 112. Further, the downhole logging system 110 also includes the second logging tool 123 component that is operable to monitor the formation 112 and further operable to obtain a second set of measurements of the formation 112. In one of such embodiments, the second logging tool 123 is a NMR logging tool. In another one of such embodiments the second logging tool 123 is a sonic logging tool. In a further one of such embodiments, the second logging tool 123 is a conventional logging tool.

The downhole logging system 110 also includes a storage medium 306. The storage medium 306 may be formed from data storage components such as, but not limited to, read-only memory (ROM), random access memory (RAM), flash memory, magnetic hard drives, solid state hard drives, as well as other types of data storage components and devices. In some embodiments, the storage medium 306 includes multiple data storage devices. Measurements obtained by the MCI logging tool 122 and the second logging tool 123 may be stored on the storage medium 306. The storage medium 306 also includes instructions, which when executed by processor 310, causes the processor 310 to perform the operations described herein.

The downhole logging system 110 also includes the processor 310, which is operable to execute the instructions stored in the storage medium 306 to perform one or more operations described herein to calculate the operation parameters based on the measurements obtained by the MCI logging tool 122, determine a first set of values of one or more formation properties based on the operation parameters and a second set of values of the formation properties based on measurement by the second logging tool 123, compare the first set of values with corresponding values of the second set of values to determine the data quality of the first set of values, confirm the first set of values if the data quality of the first set of values is above a threshold quality value, and re-calculate the at least one model parameters if the data quality of the first set of values is not above the threshold quality value.

In some embodiments, the downhole logging system 110 also includes a third logging tool (not shown) operable to obtain a third set of measurements of the formation 112. In such embodiments, the processor 310 is further operable to determine a third set of values indicative of the formation properties based on the measurements of the third logging tool and compare the first set of values for the formation properties with one or more corresponding second and third set of values to determine the data quality of the first sets of values. Additional operations of the processor 310 are described herein and are illustrated in at least FIG. 4.

Figure 4:
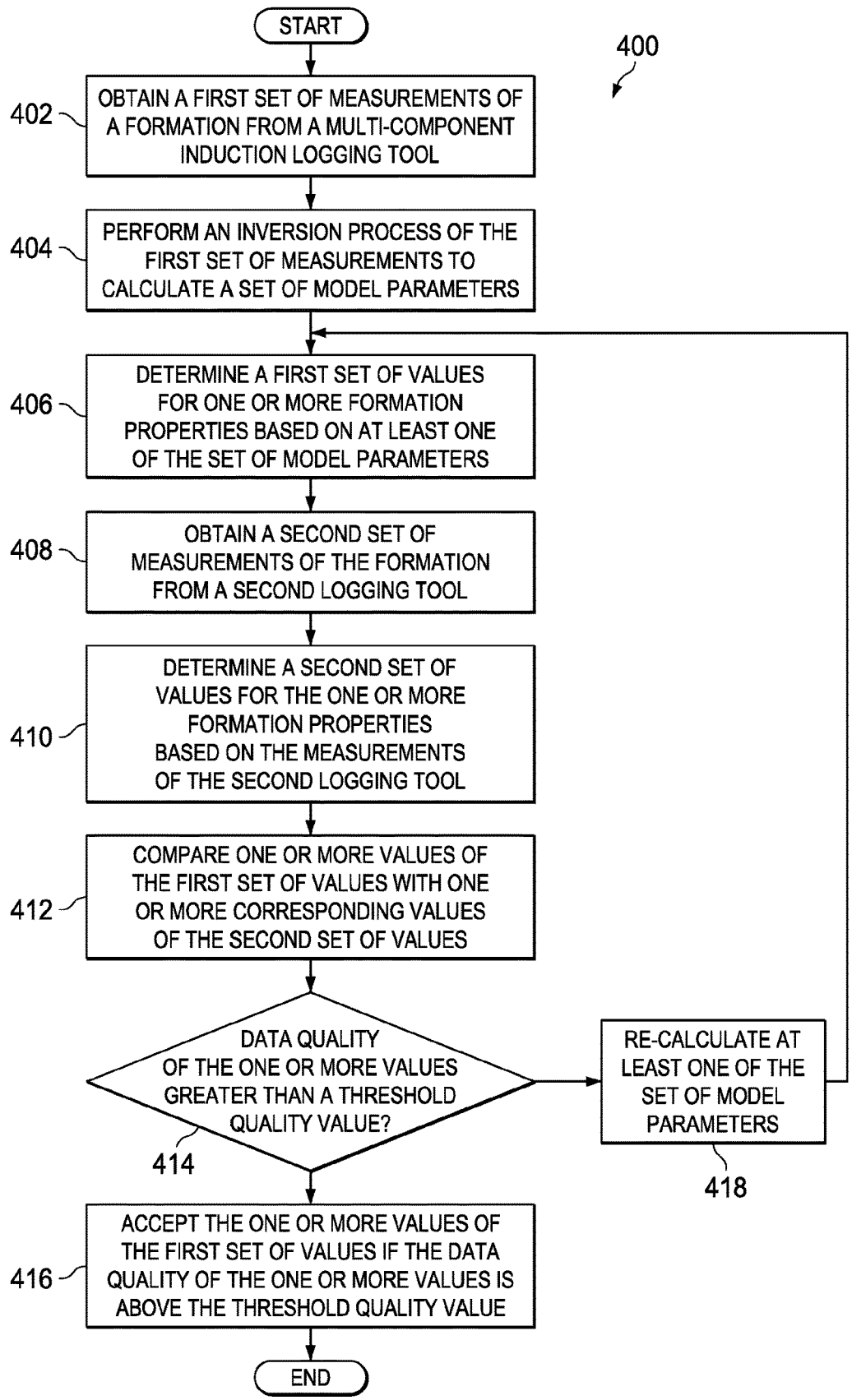
FIG. 4 illustrates a flow chart of a process to determine formation properties of the downhole formation.

FIG. 4 illustrates a flow chart of a process 400 to determine formation properties of the downhole formation 112. Although the operations in the process 400 are shown in a particular sequence, certain operations may be performed in different sequences or at the same time where feasible. Further, although the operations of the process 400 are described to be performed by the processor 310 of the downhole logging system 110, the operations may also be performed by another processor deployed downhole or by a surface based processor.

In some embodiments, the formation 112 is a laminated earth formation having a shale layer 161 and a sand layer 162. The process 400 begins when the MCI logging tool 122 and the second tool 123 each obtains measurements of the formation 112. At step 402, the processor 310 obtains a first set of measurements of the formation 112 from the MCI logging tool 122. At step 404, the processor 310 performs an inversion process of the first set of measurements to calculate a set of model parameters. As stated herein, the model parameters include the horizontal resistivity of the formation 112, the vertical resistivity of the formation 112, the relative dip angle, and the relative azimuth angle.

At step 406, the processor 310 determines, based on one or more of the set of model parameters, a first set of values for one or more formation properties of the formation 112, such as the resistivity of a shale layer 161, the resistivity of a sand layer 162, a volume of the formation 112, a volumetric fraction of the shale layer 161 relative to the volume of the laminated earth formation, a water saturation of the formation 112, as well as other formation properties disclosed herein. More particularly, the processor 310 utilizes one or more of the model parameters, such as the horizontal resistivity of the formation 112 and the vertical resistivity of the formation 112 as input values in one or more geologic models to determine one or more values of the formation properties. In some embodiments, the processor 310 utilizes the horizontal resistivity of the formation 112 and the vertical resistivity of the formation 112 as input model parameters in the Bimodal rock-physics model to determine the resistivity of the sand layer 162, the resistivity of the shale layer 161, the volume of the formation 112, the volumetric fraction of laminated shale layer 161 relative to the volume of the formation 112, and the water saturation of the formation 112.

At step 408, the processor 310 obtains a second set of measurements of the formation 112 from the second logging tool 123. The second logging tool 123 may be a NMR logging tool, a sonic logging tool, or another type of logging tool that is operable to obtain a set of measurements of the formation 112. At step 410, the processor 310 determines a second set of values for the one or more formation properties based on the measurements of the second logging tool 123.

For example, if the second logging tool 123 is a NMR logging tool, then the processor 310 is operable to determine the volume of the formation 112, the volumetric fraction of the shale layer relative to the volume of the laminated earth formation 112, and the water saturation of the formation 112 from the measurements of the NMR logging tool. At step 412, the processor 310 compares one or more values of the first set of values with one or more corresponding values of the second set of values to determine the data quality of one or more values of the first set of values, which are obtained based on the measurements of the MCI logging tool 122.

At step 414, if the data quality of the one or more values of the first set of values is greater than a first threshold quality value, then the process 400 proceeds to step 416 and the one or more values of the first set of values would be accepted by the processor 310. In some embodiments, the data quality of the first set of values is above the threshold quality value if the first set of values for the formation properties and the second set of values for corresponding formation properties do not deviate by more than a threshold discrepancy value. For example, if the first set of values indicate that the volumetric fraction of the laminated shale in the formation 112 is 10% and the water saturation of the formation 112 is 5%, the second set of values indicate that the volumetric fraction of the laminated shale in the formation 112 is 11% and the water saturation of the formation 112 is 9%, and the threshold discrepancy value is 5%, then the processor 310 would consider the first set of values to be acceptable. In some embodiments, the threshold discrepancy value is an absolute value or an absolute percentage. In other embodiments, the threshold discrepancy value is a relative value or percentage. In further embodiments, the threshold discrepancy values of different formation properties are different.

Alternatively, at step 414, if the data quality of the one or more values is not greater than the threshold quality value, then the process 400 proceeds to step 418. For example, if the first set of values indicate that the volumetric fraction of the laminated shale in the formation 112 is 70% and the water saturation of the formation 112 is 5%, the second set of values indicate that the volumetric fraction of the laminated shale in the formation 112 is 40% and the water saturation of the formation 112 is 30%, and the threshold discrepancy value is 10%, then the data quality of the first set of values would not be greater than the threshold quality value. As step 418, the processor 310 re-calculates at least one of the set of model parameters. In some embodiments, the processor 310 performs another inversion process described herein to obtain a new set of values for the first set of model parameters. The process 400 then returns to step 406 and the processor 310 determines the first set of values for the one or more formation properties based on the re-calculated values of the model parameters.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to determine formation properties of a downhole formation, the method comprising obtaining a first set of measurements of a formation from a multi-component induction logging tool; performing an inversion process of the first set of measurements to determine a first set of values for one or more formation properties of the formation; obtaining a second set of measurements of the formation from a second logging tool; determining a second set of values for the one or more formation properties based on the measurements of the second logging tool; comparing one or more values of the first set of values with one or more corresponding values of the second set of values to determine a data quality of the one or more values of the first set of values; and accepting the one or more values of the first set of values if the data quality of the one or more values is above a threshold quality value.

Clause 2, the method of clause 1, wherein performing an inversion process of the first set of measurements comprises calculating a set of model parameters of the downhole formation based on the first set of measurements; and determining the first set of values for the one or more formation properties based on the set of model parameters, wherein the set of model parameters comprises a horizontal resistivity of the formation, a vertical resistivity of the formation, and a relative dip angle between a tool axis of the multi-component induction logging tool and a first plane normal to the formation based on the first set of measurements of the formation.

Clause 3, the method of clause 1 or 2, further comprising re-calculating at least one of the set of model parameters if the data quality of the one or more values is not above the threshold quality value.

Clause 4, the method of at least one of clauses 1-3, wherein the formation is a laminated earth formation comprising a shale layer and a layer of reservoir rock, wherein the reservoir rock is a sand layer.

Clause 5, the method of at least one of clauses 1-4, further comprising determining at least one of a resistivity of the shale layer, a resistivity of the sand layer, a volume of the laminated earth formation, a volumetric fraction of the shale layer relative to the volume of the laminated earth formation, and a water saturation of the formation based on at least one of the set of model parameters, wherein the one or more formation properties of the formation comprises the resistivity of the shale layer, the resistivity of the sand layer, the volume of the laminated earth formation, and the water saturation of the formation.

Clause 6, the method of at least one of clauses 1-5, further comprising utilizing an equation for a bimodal rock-physical model to determine the resistivity of the sand layer, the volume of the laminated earth formation, and the volumetric fraction of the shale layer relative to the volume of the laminated earth formation, based on the horizontal resistivity of the formation and the vertical resistivity of the formation.

Clause 7, the method of at least one of clauses 1-6, wherein the second logging tool is a nuclear magnetic resonance logging tool, wherein determining the second set of values for the one or more formation properties comprises determining at least one of the resistivity of the shale layer, the resistivity of the sand layer, and the volume of the laminated earth formation based on the measurements of the nuclear magnetic resonance logging tool.

Clause 8, the method of at least one of clauses 1-7, wherein determining if the data quality of one or more values of the first set of values is above the threshold quality value comprises comparing at least one of the first set of values indicative of the resistivity of the shale layer, the resistivity of the sand layer and a volume of the laminated earth formation obtained by the multi-component induction logging tool with corresponding values of the second set of values obtained by the nuclear magnetic resonance logging tool.

Clause 9, the method of at least one of clauses 1-8, wherein the data quality of the one or more values of the first set of values is above the threshold quality value if a maximum of differences between the at least one of the first set of values indicative of the resistivity of the shale layer, the resistivity of the sand layer, the volume of the laminated earth formation, and the volumetric fraction of the shale layer relative to the volume of the laminated earth formation, obtained by the multi-component induction logging tool and the at least one corresponding second set of values obtained by the nuclear magnetic resonance logging tool is less than a threshold discrepancy value.

Clause 10, the method of at least one of clauses 1-9, further comprising determining a lower bound of the vertical resistivity of the formation; and determining an upper bound of the vertical resistivity of the formation, wherein the data quality of the one or more values is above the threshold quality value if the vertical resistivity of the formation determined by the multi-component induction logging is between the lower bound and the upper bound of the vertical resistivity of the formation.

Clause 11, the method of at least one of clauses 1-10, further comprising obtaining a third set of measurements of the formation from a third logging tool; and determining a third set of values for the one or more formation properties based on the measurements of the third logging tool, wherein determining the data quality of one or more values of the first set of values is based on one or more corresponding values of the third set of values.

Clause 12, the method of at least one of clauses 1-11, wherein the third logging tool is a sonic logging tool, and wherein determining the third set of values for the one or more formation properties comprises determining at least one of a resistivity of a shale layer, a resistivity of a sand layer, a volume of a laminated earth formation, and a volumetric fraction of the shale layer relative to the volume of the laminated earth formation based on the measurements of the sonic logging tool.

Clause 13, a downhole logging system comprising a multi-component induction logging tool operable to obtain a first set of measurements of a formation, the formation being a laminated earth formation having a shale layer and a sand layer; a second logging tool operable to obtain a second set of measurements of the formation; and a processor operable to perform an inversion process of the first set of measurements to calculate a set of model parameters, the set of model parameters comprising a horizontal resistivity of the formation, a vertical resistivity of the formation, and a relative dip angle; determine a first set of values for one or more formation properties of the formation based on at least one of the set of model parameters, the one or more formation properties of the formation comprising at least one of a resistivity of the shale layer, a resistivity of the sand layer, a volume of the laminated earth formation, a volumetric fraction of the shale layer relative to the volume of the laminated earth formation, and a water saturation of the formation; determine a second set of values for the one or more formation properties based on the measurements of the second logging tool; compare one or more values of the first set of values with one or more corresponding values of the second set of values to determine a data quality of the one or more values of the first set of values; and accept the one or more values of the first set of values if the data quality of the one or more values is above a threshold quality value.

Clause 14, the downhole logging system of clause 13, wherein the processor is further operable to re-calculate at least one of the set of model parameters if the data quality of the one or more values is not above the threshold quality value.

Clause 15, the downhole logging system of clause 13 or 14, wherein the second logging tool is a nuclear magnetic resonance logging tool, and wherein the processor is further operable to determine at least one of the resistivity of the shale layer, the resistivity of the sand layer, and the volume of the laminated earth formation based on the measurements of the nuclear magnetic resonance logging tool.

Clause 16, the downhole logging system of at least one of clauses 13-15, further comprising a third logging tool operable to obtain a third set of measurements of the formation, wherein the processor is further operable to determine a third set of values for the one or more formation properties based on the measurements of the third logging tool; and compare the one or more values of the first set of values with one or more corresponding values of the third set of values to determine the data quality of the one or more values of the first set of values.

Clause 17, the downhole logging system of at least one of clauses 13-16, wherein the third logging tool is a sonic logging tool, and wherein determining the third set of values for the one or more formation properties comprises determining at least one of the resistivity of the shale layer, the resistivity of the sand layer, the volume of the laminated earth formation, and the volumetric fraction of the shale layer relative to the volume of the laminated earth formation, based on the measurements of the sonic logging tool.

Clause 18, a non-transitory machine-readable medium comprising instructions stored therein, which when executed by one or more processors, causes the one or more processors to perform operations comprising obtaining a first set of measurements of a formation from a multi-component induction logging tool, the formation being a laminated earth formation having a shale layer and a sand layer; performing an inversion process of the first set of measurements to calculate a set of model parameters comprising a horizontal resistivity of the formation, a vertical resistivity of the formation, and a relative dip angle; determining a first set of values for one or more formation properties of the formation based on at least one of the set of model parameters, the one or more formation properties of the formation comprising at least one of a resistivity of the shale layer, a resistivity of the sand layer, a volume of the laminated earth formation, a volumetric fraction of the shale layer relative to the volume of the laminated earth formation, and a water saturation of the formation; obtaining a second set of measurements of the formation from a second logging tool; determining a second set of values for the one or more formation properties based on the measurements of the second logging tool; comparing one or more values of the first set of values with one or more corresponding values of the second set of values to determine a data quality of the one or more values of the first set of values; accepting the one or more values of the first set of values if the data quality of the one or more values is above a threshold quality value;

and re-calculating at least one of the set of model parameters if the data quality of the one or more values is not above the threshold quality value.

Clause 19, the non-transitory machine-readable medium of clause 18, further comprising instructions stored therein, which when executed by one or more processors, causes the one or more processors to perform operations comprising obtaining a third set of measurements of the formation from a third logging tool; and determining a third set of values for the one or more formation properties based on the measurements of the third logging tool, wherein determining the data quality of one or more values of the first set of values is based on one or more corresponding values of the third set of values.

Clause 20, the non-transitory machine-readable medium of clause 18 or 19, wherein the third logging tool is a sonic logging tool, and wherein determining the third set of values for the one or more formation properties comprises determining at least one of the resistivity of the shale layer, the resistivity of the sand layer, and the volume of the laminated earth formation based on the measurements of the sonic logging tool.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof

I claim:

1. A method to determine formation properties of a downhole formation, the method comprising:
    obtaining a first set of measurements of a formation from a multi-component induction logging tool;
    performing an inversion process of the first set of measurements to calculate a set of model parameters of the downhole formation based on the first set of measurements, wherein the formation is a laminated earth formation comprising a shale layer and a layer of reservoir rock, and wherein the set of model parameters comprises a horizontal resistivity of the formation and a vertical resistivity of the formation;
    utilizing an equation for a bimodal rock-physical model to determine a first set of values for one or more formation properties of the formation based on the set of model parameters, wherein the one or more formation properties of the formation comprise a volume of the laminated earth formation, and a volumetric fraction of the shale layer relative to the volume of the laminated earth formation, and wherein determining the first set of values for the one or more formation properties of the formation comprises determining the volume of the laminated earth formation, and the volumetric fraction of the shale layer relative to the volume of the laminated earth formation based on the horizontal resistivity of the formation and the vertical resistivity of the formation;
    obtaining a second set of measurements of the formation from a second logging tool;
    determining a second set of values for the one or more formation properties based on the measurements of the second logging tool;
    comparing one or more values of the first set of values with one or more corresponding values of the second set of values to determine a data quality of the one or more values of the first set of values; and
    accepting the one or more values of the first set of values if the data quality of the one or more values is above a threshold quality value.

2. The method of claim 1, wherein
    the set of model parameters comprises a relative dip angle between a tool axis of the multi-component induction logging tool and a first plane normal to the formation based on the first set of measurements of the formation.

3. The method of claim 1, further comprising re-calculating at least one of the set of model parameters if the data quality of the one or more values is not above the threshold quality value.

4. The method of claim 3, wherein the reservoir rock is a sand layer.

5. The method of claim 4, further comprising:
    determining at least one of a resistivity of the shale layer, a resistivity of the sand layer and a water saturation of the formation based on at least one of the set of model parameters,
    wherein the one or more formation properties of the formation comprises the resistivity of the shale layer, the resistivity of the sand layer, and the water saturation of the formation.

6. The method of claim 5, further comprising utilizing the equation for the bimodal rock-physical model to determine the resistivity of the sand layer, based on the horizontal resistivity of the formation and the vertical resistivity of the formation.

7. The method of claim 6, wherein the second logging tool is a nuclear magnetic resonance logging tool, and wherein determining the second set of values for the one or more formation properties comprises determining at least one of the resistivity of the shale layer, the resistivity of the sand layer, and the volume of the laminated earth formation based on the measurements of the nuclear magnetic resonance logging tool.

8. The method of claim 7, wherein determining if the data quality of one or more values of the first set of values is above the threshold quality value comprises comparing at least one of the first set of values indicative of the resistivity of the shale layer, the resistivity of the sand layer and a volume of the laminated earth formation obtained by the multi-component induction logging tool with corresponding values of the second set of values obtained by the nuclear magnetic resonance logging tool.

9. The method of claim 8, wherein the data quality of the one or more values of the first set of values is above the threshold quality value if a maximum of differences between the at least one of the first set of values indicative of the resistivity of the shale layer, the resistivity of the sand layer, the volume of the laminated earth formation, and the volumetric fraction of the shale layer relative to the volume of the laminated earth formation, obtained by the multi-component induction logging tool and the at least one corresponding second set of values obtained by the nuclear magnetic resonance logging tool is less than a threshold discrepancy value.

10. The method of claim 7, further comprising:
determining a lower bound of the vertical resistivity of the formation; and
determining an upper bound of the vertical resistivity of the formation,
wherein the data quality of the one or more values is above the threshold quality value if the vertical resistivity of the formation determined by the multi-component induction logging is between the lower bound and the upper bound of the vertical resistivity of the formation.

11. The method of claim 1, further comprising:
obtaining a third set of measurements of the formation from a third logging tool; and
determining a third set of values for the one or more formation properties based on the measurements of the third logging tool,
wherein determining the data quality of one or more values of the first set of values is based on one or more corresponding values of the third set of values.

12. The method of claim 11, wherein the third logging tool is a sonic logging tool, and wherein determining the third set of values for the one or more formation properties comprises determining at least one of a resistivity of a shale layer, a resistivity of a sand layer, a volume of a laminated earth formation, and a volumetric fraction of the shale layer relative to the volume of the laminated earth formation based on the measurements of the sonic logging tool.

13. A downhole logging system comprising:
a multi-component induction logging tool operable to obtain a first set of measurements of a formation, the formation being a laminated earth formation having a shale layer and a sand layer;
a second logging tool operable to obtain a second set of measurements of the formation; and
a processor operable to:
perform an inversion process of the first set of measurements to calculate a set of model parameters, the set of model parameters comprising a horizontal resistivity of the formation, a vertical resistivity of the formation, and a relative dip angle;
utilize an equation for a bimodal rock-physical model to determine a first set of values for one or more formation properties of the formation based on at least one of the set of model parameters, the one or more formation properties of the formation comprising at least one of a resistivity of the shale layer, a resistivity of the sand layer, a volume of the laminated earth formation, a volumetric fraction of the shale layer relative to the volume of the laminated earth formation, and a water saturation of the formation, and wherein determining the first set of values for the one or more formation properties of the formation comprises determining the volume of the laminated earth formation, and the volumetric fraction of the shale layer relative to the volume of the laminated earth formation based on the horizontal resistivity of the formation and the vertical resistivity of the formation;
determine a second set of values for the one or more formation properties based on the measurements of the second logging tool;
compare one or more values of the first set of values with one or more corresponding values of the second set of values to determine a data quality of the one or more values of the first set of values; and
accept the one or more values of the first set of values if the data quality of the one or more values is above a threshold quality value.

14. The downhole logging system of claim 13, wherein the processor is further operable to re-calculate at least one of the set of model parameters if the data quality of the one or more values is not above the threshold quality value.

15. The downhole logging system of claim 14, wherein the second logging tool is a nuclear magnetic resonance logging tool, and wherein the processor is further operable to determine at least one of the resistivity of the shale layer, the resistivity of the sand layer, and the volume of the laminated earth formation based on the measurements of the nuclear magnetic resonance logging tool.

16. The downhole logging system of claim 14, further comprising:
a third logging tool operable to obtain a third set of measurements of the formation,
wherein the processor is further operable to:
determine a third set of values for the one or more formation properties based on the measurements of the third logging tool; and
compare the one or more values of the first set of values with one or more corresponding values of the third set of values to determine the data quality of the one or more values of the first set of values.

17. The downhole logging system of claim 16, wherein the third logging tool is a sonic logging tool, and wherein determining the third set of values for the one or more formation properties comprises determining at least one of the resistivity of the shale layer, the resistivity of the sand layer, the volume of the laminated earth formation, and the volumetric fraction of the shale layer relative to the volume of the laminated earth formation, based on the measurements of the sonic logging tool.

18. A non-transitory machine-readable medium comprising instructions stored therein, which when executed by one or more processors, causes the one or more processors to perform operations comprising:
obtaining a first set of measurements of a formation from a multi-component induction logging tool, the formation being a laminated earth formation having a shale layer and a sand layer;
performing an inversion process of the first set of measurements to calculate a set of model parameters comprising a horizontal resistivity of the formation, a vertical resistivity of the formation, and a relative dip angle;
utilizing an equation for a bimodal rock-physical model to determine a first set of values for one or more formation properties of the formation based on at least one of the set of model parameters, the one or more formation properties of the formation comprising at least one of a resistivity of the shale layer, a resistivity of the sand layer, a volume of the laminated earth formation, a volumetric fraction of the shale layer relative to the volume of the laminated earth formation, and a water saturation of the formation, and wherein determining the first set of values for the one or more formation properties of the formation comprises determining the volume of the laminated earth formation, and the volumetric fraction of the shale layer relative to the volume of the laminated earth formation based on the horizontal resistivity of the formation and the vertical resistivity of the formation;

obtaining a second set of measurements of the formation from a second logging tool;

determining a second set of values for the one or more formation properties based on the measurements of the second logging tool;

comparing one or more values of the first set of values with one or more corresponding values of the second set of values to determine a data quality of the one or more values of the first set of values;

accepting the one or more values of the first set of values if the data quality of the one or more values is above a threshold quality value; and re-calculating at least one of the set of model parameters if the data quality of the one or more values is not above the threshold quality value.

19. The non-transitory machine-readable medium of claim 18, further comprising instructions stored therein, which when executed by one or more processors, causes the one or more processors to perform operations comprising:

obtaining a third set of measurements of the formation from a third logging tool; and determining a third set of values for the one or more formation properties based on the measurements of the third logging tool, wherein determining the data quality of one or more values of the first set of values is based on one or more corresponding values of the third set of values.

20. The non-transitory machine-readable medium of claim 19, wherein the third logging tool is a sonic logging tool, and wherein determining the third set of values for the one or more formation properties comprises determining at least one of the resistivity of the shale layer, the resistivity of the sand layer, and the volume of the laminated earth formation based on the measurements of the sonic logging tool.

* * * * *